US00RE34601E

United States Patent [19]

Hochstein

[11] E Patent Number: Re. 34,601

[45] Reissued Date of Patent: May 10, 1994

[54] CAPACITIVE LIQUID SENSOR

[76] Inventor: Peter A. Hochstein, 2966 River Valley Dr., Troy, Mich. 48098

[21] Appl. No.: 922,046

[22] Filed: Jul. 29, 1992

Related U.S. Patent Documents

Reissue of:

[64] Patent No.: 4,947,689
Issued: Aug. 14, 1990
Appl. No.: 297,113
Filed: Jan. 13, 1989

[51] Int. Cl.[5] ..... G01F 23/26; G08B 21/00

[52] U.S. Cl. ..... 73/304 C; 331/65; 361/284

[58] Field of Search ..... 73/304 C; 34/284

[56] References Cited

U.S. PATENT DOCUMENTS

| | | | |
|---|---|---|---|
| 2,950,426 | 8/1960 | Frome | 361/284 |
| 3,010,319 | 11/1961 | Sontheimer | 73/304 C |
| 3,010,320 | 11/1961 | Sollecito | 361/284 X |
| 4,038,871 | 8/1977 | Edwards | 73/304 C |
| 4,083,038 | 4/1978 | Klebanoff | 361/284 X |
| 4,194,395 | 3/1980 | Wood | 73/304 C |
| 4,347,740 | 9/1982 | Townsend | 73/304 C |
| 4,399,699 | 8/1983 | Fujishiro | 73/304 C |
| 4,485,673 | 12/1984 | Stern | 73/304 C |
| 4,590,575 | 5/1986 | Emplit | 73/304 C X |
| 4,592,231 | 6/1986 | Kant | 73/304 C X |
| 4,730,489 | 3/1988 | Hoekstra | 361/284 X |

*Primary Examiner*—Daniel M. Yasich
*Attorney, Agent, or Firm*—Reising, Ethington, Barnard, Perry & Milton

[57] ABSTRACT

A capacitive level gauge for placement in a container (12) determines the level of substance (14) in the container (12). The gauge (10) includes a measurement capacitor (C1) for measuring level and a reference capacitor (C2) for determining dielectric constant of the substance (14). A controller (34) is responsive to the capacitors (C1, C2) for producing a level signal which simultaneously indicated the level and dielectric constant of the material. The level signal includes a frequency which is representative of dielectric constant and a pulse width representative of level. The gauge (10) supports a first pair of parallel conductive members (26, 28) to establish the measurement capacitor (C1) and a second pair of parallel conductive members (28, 32) spaced along the gauge and below the measurement capacitor (C1) to establish the reference capacitor (C2).

15 Claims, 2 Drawing Sheets

CAPACITIVE LIQUID SENSOR

Matter enclosed in heavy brackets [ ] appears in the original patent but forms no part of this reissue specification; matter printed in italics indicates the additions made by reissue.

TECHNICAL FIELD

The invention relates to a capacitance gauge which measures level by sensing change in capacitance between two plates.

BACKGROUND OF THE INVENTION

Capacitance gauges have been used in environments such as air craft, for measuring the level of fuel in a wing tank. Capacitance gauges have no moving parts and are therefore very reliable, especially in hostile environments were vibration and temperature extremes render mechanical level sensors useless. Capacitance gauges allow for relatively simple compensation of various tank shapes, where linear changes in fluid level do not correspond to linear changes in fluid volume.

Capacitance level sensors comprise two plates which establish a capacitor. All capacitance level sensors are based on the fact that electrical capacitance between two electrodes or plates is described by:

$$C(pF)=8.85\times10^{-2}S\ e\ (N-1)/d \text{ where:}$$

S = area of one plate in $cm^2$
N = number of [plate] *plates*
d = distance between plates (cm)
e = dielectric constant Changes in dielectric constant in the medium separating the plates of the measuring capacitor will cause a change in measured capacity. Air has a nominal dielectric constant equal to 1.0, and common oils or fluids such as kerosine or gasoline having nominal dielectric constant of 2.0. Such fluids rising between two parallel plates will increase the net capacitance of the measuring cell as a function of fluid height. The fluid being measured may not vary in dielectric constant, or changes in measured capacitance may erroneously be attributed to level changes.

Conventional capacitance level gauges can not handle fluids of varying dielectric constant. Other fluids such as alcohol and water, which may be present in varying amounts in modern automotive fuels are not compatible with current capacitance gauges and act as a "poison" to the gasoline by artificially increasing the bulk dielectric constant of the mixture by disproportionate amount. Ethanol and methanol have dielectric constants of 24 and 31, respectively, and water has a dielectric constant of 78. Relatively small concentrations of these additives to gasoline will change the dielectric constant of the resulting mixture by a great amount. In most cases, the addition of 10% to 15% ethanol to gasoline will raise the effective dielectric constant to approximately 5.3.

U.S. Pat. No. 4,470,300, issued Sept. 11, 1984 in the name of Kobayashi discloses a level gauge system for determining the alcohol concentration in gasohol. The patent discloses a level gauge which uses a sensing capacitor connected as an RC time constant to an astable [miltivibrator] *multivibrator* for determining the level. The frequency of the output from the astable multivibrator indicates the capacitances of the sensor. The astable multivibrator is mounted on the top of the fuel tank and is connected to the capacitor so as [the] *to* generate a signal which oscillates at a frequency depending on the capacitance of the capacitor. A period detector is connected to the oscillator in order to detect the period of the oscillatory signal therefrom. The oscillator includes the RC time constant arranged so that the oscillator generates pulses and frequencies having a minimum value which is higher than the predetermined reference value depending on the alcohol concentration in gasohol and the kind of the alcohol in gasohol.

The addition of alcohol to gasoline is the primary mechanism responsible for changes in the combustion characteristics, therefore, the alcohol constant would be quite valuable. By continually monitoring the nature of fuel mixtures in the tank, the engine control computer could program the engine operation for optimal performance in the minimum emission for any given fuel mix. A convenient way of determining the ratio of alcohol in gasoline is by monitoring the effective dielectric constant of the gasohol mixture. Incorporating a reference of normalizing capacitance cell into the level sensing capacitance gauge achieves compensation for changes in dielectric constant due to temperature variation and mixture.

U.S. Pat. No. 4,590,575,issued May 20, 1986 in the name of Emplit discloses a time base system for determining the level of fluid which utilizes a reference capacitance sensor and level capacitance sensor. The system is an on-line system wherein the time intervals from multivibrators [determines] *determine* the capacitance. The system has a measurement probe whose capacitance is a function of the level of substance in the tank and a reference probe whose capacitance is a function of the dielectric constant of the substance. Each probe is coupled to a multivibrator whose output frequencies are a function of the capacitance between the respective probe and the tank. The output signals of the two [multivibrators] *multivibrator* circuits are coupled to logic and switching circuits. The counter counts the number of input pulses and when a predetermined number have been counted, the counter inverts the binary state of the output and changes which sensor probe is transmitting the signal. The output from the transmitter includes pulses whose time duration varies as a function of probe capacitance. The low level pulse segments correspond to the frequency of the reference multivibrator and the high level pulses represent the output of the frequency of the level multivibrator. When the output signal is received, the signal is separated into two time [intervals] *interval* signals, one representing each probe. The duration of the segments used by the counter produced for the microprocessor and input representatives of the capacitance of the measurements and thereby the level of substance in the tank. The problem with such a system is that the sizes of the tank must be known since capacitance is established between a probe and a tank. Furthermore, the signal produced alternates between the reference signal and the measurement signal with time delays therebetween resulting in a less accurate system and slower responding system.

None of the prior art accurately produces a signal which simultaneously comprises information of level and dielectric constant, or compensated level measurement for any shape of container.

STATEMENT OF THE INVENTION AND ADVANTAGES

The invention is a method and capacitance level gauge assembly for placement in a container to determine the amount or level of a substance therein and the method of gaging the amount or level of substance in the container. The assembly includes a sensing means having a first and second end for measuring the level of the substance between the first and second ends. The sensor means includes measurement capacitance means extending between the first and second ends comprising at least two parallel conductive members to establish an electrical capacitance representative of level, and reference capacitance means connected at the second end comprising at least two parallel conductive members to establish an electrical capacitance representative of dielectric constant. Measuring means is responsive to the level capacitance and reference capacitance for producing a level signal simultaneously representing both level and dielectric constant.

An advantage of this invention is that its use does not require a predetermined shaped container. Additionally, the level signal simultaneously indicates the level capacitance and reference capacitance for accurate indication of the level.

DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 1:
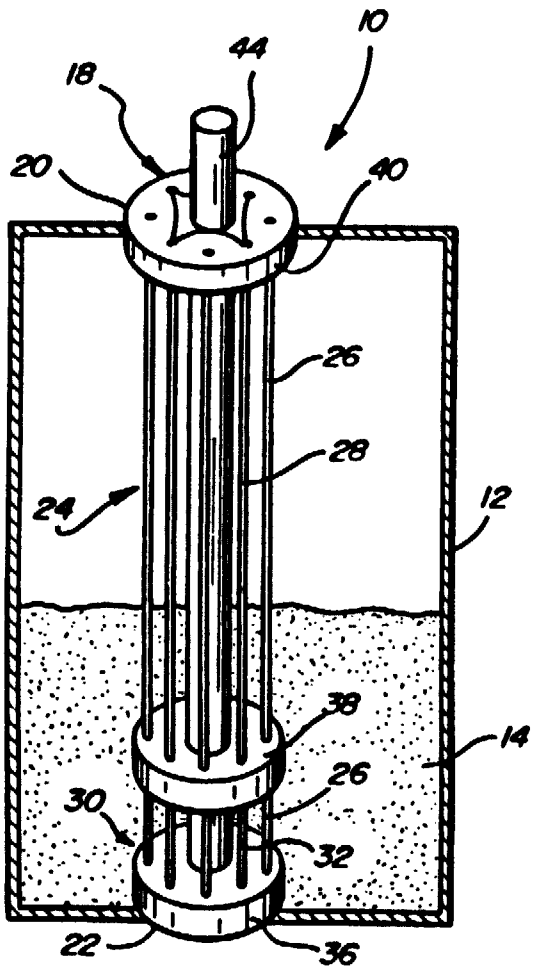
FIG. 1 is a perspective view of a first embodiment of the sensing means.

A capacitance level gauge assembly for determining the amount or level of substance in a container is generally shown at 10 in FIG. 1. The assembly 10 determines the level of the substance 14 in the container 12 by compensating for change in dielectric constant. The substance 14 may be comprised of any materials, such as a solid or liquid, as long as a interface 16 is established above and below which there is a change in dielectric constant. In the preferred embodiment, the interface 16 is established between air and fuel of a vehicle in a fuel tank 12. Air generally has a dielectric constant of 1.0, whereas the fuels and alcohols have a greater dielectric constant.

The assembly 10 comprises a sensing means 18 having a first 20 and second 22 end for measuring the level of substance 14. The sensing means 18 includes measurement capacitance means 24 extending between the first 20 and second 22 ends comprising at least two parallel conductive members 26, 28 establishing a level capacitor Cl having an electrical capacitance representative of the level in the container 12. The sensing means 18 also includes reference capacitance means 30 connected at the second end 22 comprising at least two parallel conductive members 26, 32 establishing a reference capacitor C2 having an electrical capacitance representative of dielectric constant. Measuring means 34 is responsive to the level capacitor Cl and the reference capacitor C2 for producing a level signal simultaneously representing both the level and dielectric constant of the substance 14. The measuring means 34 determines the level as a function of dielectric constant of the substance 14 and level submerged in the substance 14. An interface 16 is located between the first 20 and second 22 ends of the measurement capacitance means 24, which interface 16 moves longitudinally along the measurement capacitance means 24 changing the capacitance and therefore the level signal.

Figure 3:
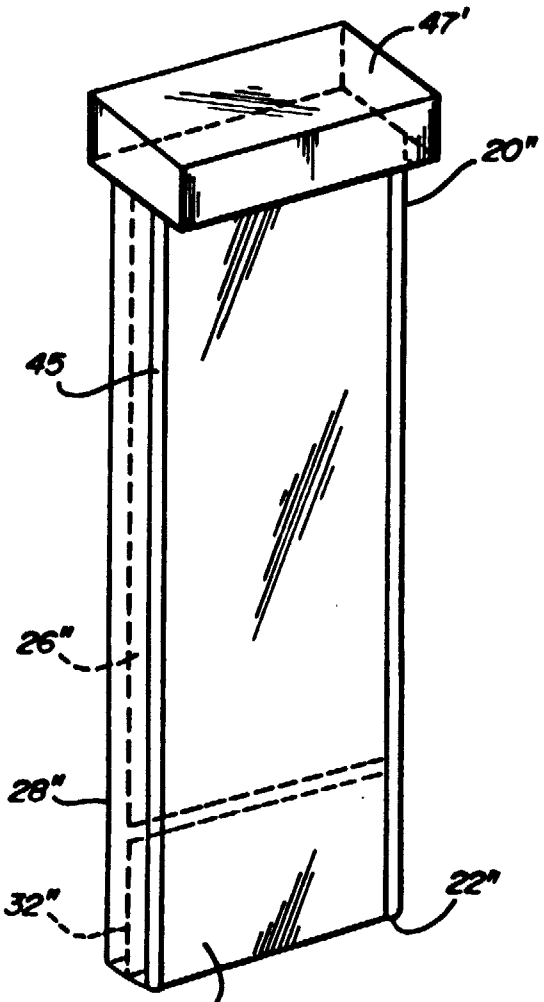
FIG. 3 is a perspective view of a third embodiment of the sensing means.
Figure 2:
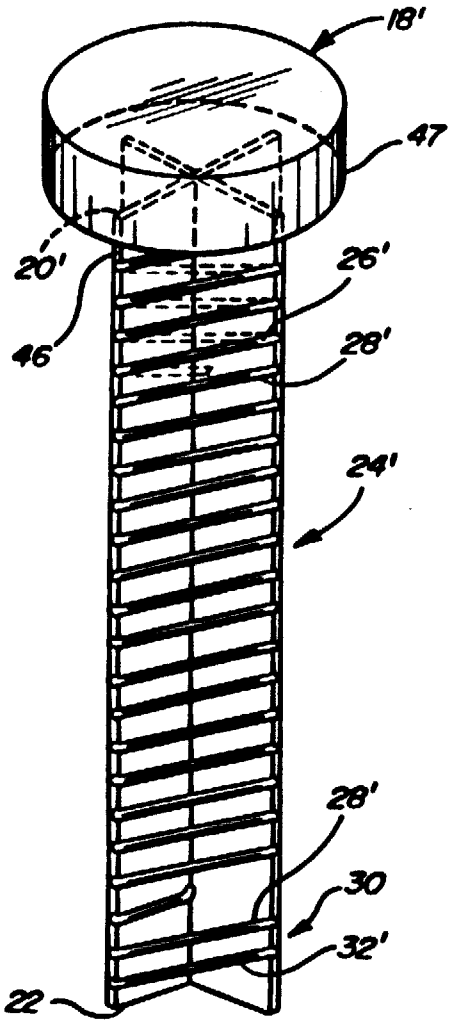
FIG. 2 is a perspective view of a second embodiment of the sensing means.

FIGS. 1 through 3 illustrate three embodiments of the sensing means 18. Generally, the reference capacitance means 30 of the sensing means 18 is disposed at the second end 22 which is the base or lower end of the sensing means 18 so that it will always be submerged in the fluid or substance 14. The measurement capacitance means 24 is arranged so that it senses the height or level of fluid 14 within the tank or container 12. Therefore, the measurement capacitance means 24 extends a distance to allow the container 12 to become full and empty while the interface 16 moves along the measurement capacitance means 24 between the first end and reference capacitance means 30.

As illustrated in FIG. 1, the first embodiment of the sensing means 18 comprises multiple parallel wires 26, 28, 32 which form alternating "plates" of two separate sensing capacitors C1, C2 extending the length of the sensing means 18. The reference capacitance means 30 is submerged below the substance 14 at the lower end or second end 22 of the sensing means 18 and comprises multiple parallel wires 28, 32 between a base insulator 36 and a intermediate insulator 38. The measurement capacitance means 24 extends a distance which will incorporate all changes in the level of the substance 14 and comprises multiple parallel wires 26, 28 between the intermediate insulator 38 and a ceiling insulator 40. The insulators 36, 38, 40 are generally circular rings or disks for receiving a support post 44 therethrough. The support post 44 maintains the insulator rings 36, 38, 40 at their respective locations. The multiple parallel wires 26, 28, 32 are spaced apart circumferentially about the support post 44 and into the insulators 36, 38, 40. The parallel wires 26, 28, 32 are insulated. Alternate wires of the measurement capacitance means 24 and reference capacitance means 30 are connected to ground and the remaining to the control means 34. In the preferred embodiment, there are twenty-four (24) parallel wires only eight (*8*) are shown. Twelve (12) wires 28 are grounded, and four (*4*) wires 26 are connected comprising a plate of the measurement capacitor Cl and four (*4*) wires 32 are connected together comprising a plate of the reference capacitor C2, which wires 26, 28, 32 are connected to the [control] *measuring* means 34.

FIG. 2 illustrates the second embodiment of the sensing means 18' which [include] *includes* two continuous adjacent wires wound in a two or dual lead helical configuration to establish the "plates" of both capacitors Cl, C2. The reference capacitance means 30 or cell is placed at the base or second end 22' of the sensing means 18 and shares the interwound ground or common electrode 28' with the measurement capacitance means 24'. The advantage of the helical design is the ability to compensate for non linear volume-level relationships in some tanks 12 by varying the pitch of the wire windings 26', 28', 32'. The sensing means 18' comprises a generally cruciform or cross-shaped support 46 of insulating material with a control, housing 47 attached at the upper or first end 20'. The common or ground wire 28' is wound to extend the length of the support 46 and the second wire 32' is wound at the base of second end 22' to produce the reference capacitor C2 and a third wire 26' is wound between the base and the upper end to produce the measurement capacitor Cl. The wires are insulated.

The third embodiment of the sensing means [18] is illustrated in FIG. 3. The sensing means 18 (*FIG. 3*) includes two outside parallel, flat ground plates 28" and a measurement plate 26" and reference plate 32" located therebetween. The reference plate 32" is located at the second end 22' or base of the sensing means 18, (*FIG. 3*) and the measurement plate 26" is located thereabove and spaced from the reference plate 32". The [control] *measuring* means 34 may be housed 47' at the upper end or first end 20' of the sensing means 18 (*FIG. 3*). The plates may be secured to a support housing 45 extending the length of the sensing means 18 (*FIG. 3*) to support the outside edges of the plate 26", 28", 32". The housing 45 is insulated and may contain wires extending between the plates 26", 28", 32" and the control means 34.

By utilizing the designs of one of the three embodiments, common design features have been developed. The support structure must allow fluid to drain freely. Liquid captured under the wires or plates will obviously give erroneous [reading] *readings*. Wire or plate supports must be designed to minimize the parasitic capacity of the sensing capacitors C1, C2 and their leads, so that the gauge 10 is more sensitive to change in the dielectric constant of the medium surrounding the wire electrodes. Therefore, as much of the sensing wires or plates 26, 28, 32 needs to be freely suspended in air or fluid. Sensor support structures which are immersed in gasohol, can not be fabricated out of materials which absorb water such as nylon. Even small amounts of water absorbed by the plastic from the fuel, grossly affected the capacitance readings since the dielectric constant of water is nearly forty (40) times that of gasoline. [Non hygroscopic] *Non-hygroscopic* plastics such as high density polyethelyne and polypropelene [are-more] *are more* suitable.

Wires or plates used as capacitor electrodes 26, 28, 32 must be insulated to prevent electrical conduction through imperfect dielectrics, such as water bearing gasohols. Polyester-imide and epoxi-phenolic resin coatings offer the requisite long term solvent resistance to various gasohol blends. In order to insure complete submergence of the reference capacitance means 30 in minimal amounts of fluid, the reference capacitance means 30 must be physically small, or at least short, and yet obtains efficient capacitance to provide reliable dielectric constant readings of the fuel in the tank 12. lengths from the capacitance means 24, 30 to control means 34 must be kept short and direct, so that parasitic capacities is minimized. The parallel plates 26, 28, 32 in the third embodiment may be made of virtually any conductive material, such as aluminum, steel, brass, copper, etc., and may be coated with similar insulating media as the wires.

The measuring means 34 is responsive to the measurement capacitance means 24 and reference capacitance means 30 to determine the level and dielectric constant, respectively. The measuring means 34 includes two time base generators 48, 50. The period established by each capacitor Cl, C2 in an RC or LC configuration is measured, and the resultant values are then multiplied with appropriate constants to yield a corrected fluid level. It is to be understood that several methods may be used in measuring means 34, and the invention is not limited thereto.

Figure 4:
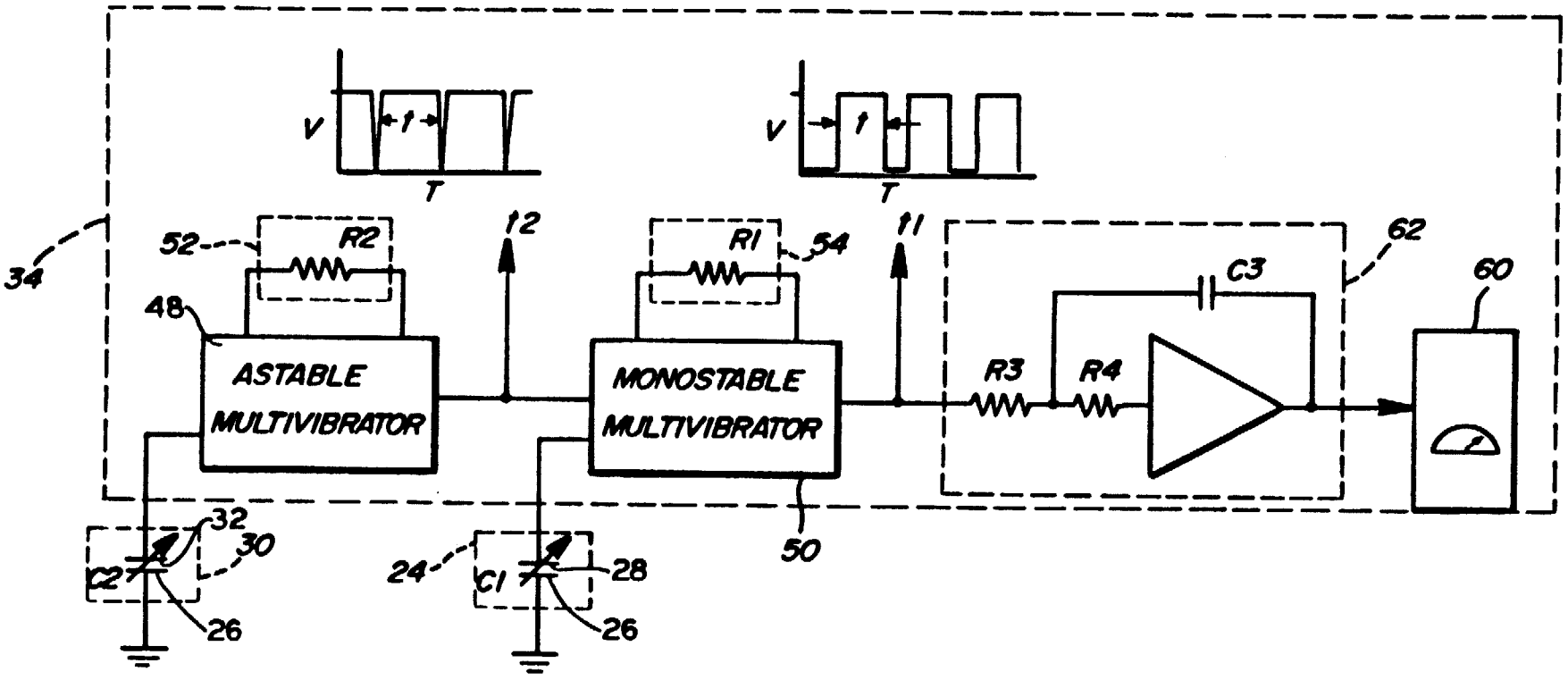
FIG. 4 is a schematic diagram of the subject invention.

In the preferred embodiment as shown in FIG. 4, the measuring means 34 includes reference timing means 48 connected to the reference capacitance means 30 for producing a reference signal having a timing component t2 indicative of the capacitance. The reference timing means 48 may comprise an astable multivibrator for producing the reference signal having frequency representative of the capacitance of reference capacitor C2. The reference timing means 48 includes reference resistive means 52 acting with the reference capacitor C2 for establishing an RC time constant 12 of the reference signal.

The measuring means 34 includes level timing means 50 connected to the measurement capacitance means 24 for producing a level signal having a timing component t1 indicative of the capacitance. The level timing means 50 receives the reference signal wherein the level signal includes two timing components tl, t2 indicative of the capacitance of level capacitor Cl and of the reference capacitor C2, respectively. The level timing means 50 includes monostable multivibrator for producing the level signal having a pulse width tl indicative of the level capacitance and the frequency indicative of the reference capacitance. The level timing means 50 includes level resistive means 54 for acting with a level capacitor Cl for establishing an RC time constant t2 of the level signal.

The reference timing means 48, which is the astable multivibrator or free running oscillator, has a frequency t2 which is determined by the value of the reference capacitance means 30 or reference capacitor C2. The output of the stable multivibrator triggers the level timing means 50, or monostable multivibrator, wherein the output pulse width tl is established by the level sensing capacitor Cl or measurement capacitance means 24. The combination of the measurement capacitance means 24 and reference capacitance means 30 with the reference resistive means 52 and level resistive means 54, respectively, comprises the RC time constant for producing frequency t2 and pulse width tl. The ratio of the reference capacitor C2 to the level capacitor Cl is adjustable and may be a function of the geometry for a given tank. Experiments have exhibited C2 to Cl capacity ratios of 1:5 to 1:10.

The fluid level values are a function of the output duty cycle (tl/t2). The output voltage is a time averaged voltage, proportional to the ratio of tl to t2 multiplied by the peak to peak voltage of the input pulses. The terms relating to the dielectric constant fall out of the equation, making the system self compensating when the appropriate proportionality constants are applied.

The measuring means 34 further includes voltage follower and low pass filter means 62 connected to a meter means 60. The meter means 60 receives the level signal and produces a visual output of actual level or volume of the substance 14 in the container which is compensated for changes in dielectric constant. The meter means 60 may include a multiplier factor to determine the volume of substance.

Alternatively, the measuring means 34 may include rectifier means for receiving and rectifying a level signal producing a rectified signal. Filter means receives and filters the rectified signal producing a filtered signal. A meter means receives the filtered signal and visually displays the magnitude of the filter signal. The meter means may be an analog meter which is directly responsive to the magnitude of the filtered signal. The measuring means 34 may alternately include digital monitor means for receiving the level signal and for determining dielectric constant by the frequency of the level signal and determining the level by the level signal.

The measuring means 34 may also include a monitor with the discrete logic or directly with a microprocessor which receives the output of the level timing means 50. The repetition rate or frequency output pulses would yield the dielectric constant correction parameter, while the duty cycle measurement plus the influence of the first parameter would be a function of fluid height. With direct digital processing, the two timing functions can be totally independent.

The invention also includes method of gauging the amount or level of substance 14 in the container. The method includes the steps of sensing a first capacitance indicative *of a level constant* and a sensing a second capacitance indicative of dielectric constant. A level signal is produced having a frequency indicative of one of the first capacitance and second capacitance and a pulse width indicative of the other of the first capacitance and second capacitance. More specifically, the reference signal has frequency indicative of dielectric constant. The level signal is produced which includes producing a level signal having pulse width indicative of the level and frequency indicative of dielectric constant.

The invention has been described in an illustrative manner, and it is to be understood that the terminology which has been used is intended to be in the nature of words of description rather than of limitation. Obviously, many modifications and variations of the present invention are possible in light of the above teachings. It is therefore, to be understood that within the scope of the appended claims wherein reference numerals are merely for convenience and are not to be in any way limiting, the invention may be practiced otherwise than as specifically described.

What is claimed is:

1. A capacitive sensor assembly for placement in a container to determine the level of substance therein, said assembly comprising; sensing means (18) having [a] first and second [end] *ends* (22) for measuring the level of substance between said first and second [end] *ends*; said sensing means including measurement capacitance means (24) extending between said first and second ends comprising at least two parallel conductive members to establish an electrical capacitance representative of level *therebetween*, and reference capacitance means (30) connected at said second end (22) comprising at least two parallel conductive members to establish an electrical capacitance *therebetween* representative of dielectric constant; measuring means (34) responsive to said [level] *reference* capacitance *means* *(30)* for producing a reference signal representing dielectric constant and [reference] *said measurement* capacitance *means* *(24)* for producing a level signal representing level of the substance, said measuring means (34) including reference timing means (48) connected to said reference capacitance means (30) for producing a *pulsing* reference signal having a timing component indicative of said reference capacitance, and level timing means (50) independent from said reference timing means (30) and connected to said measurement capacitance means (24) for producing a *pulsing* level signal having a timing component indicative of said level capacitance.

2. An assembly as set forth in claim 1 further characterized by said reference timing means (48) comprising a free running oscillator having the timing component indicative of said reference capacitance and independent of said level capacitance, and said level timing means (50) comprising a second free running oscillator having the timing component indicative of said level capacitance.

3. A capacitive level gauge assembly for placement in a container to determine the amount or level of a substance therein, said assembly comprising; sensing means (18) having [a] first and second [end] *ends* (22) for measuring the level of substance between said first and second [end] *ends*; said sensing means including measurement capacitance means (24) extending between said first and second ends comprising at least two parallel conductive members to establish an electrical capacitance *therebetween* representative of level, and reference capacitance means (30) connected at said second end (22) comprising at least two parallel conductive members to establish an electrical capacitance *therebetween* representative of dielectric constant; measuring means (34) responsive to said level capacitance and reference capacitance for producing a *pulsing* level signal representing both level and dielectric constant; said measuring means (34) including reference timing means (48) connected to said reference capacitance means (30) for producing a *pulsing* reference signal having a timing component indicative of said reference capacitance and independent of said level capacitance, and level timing means (50) connected to said measurement capacitance means (24) for receiving said reference signal and producing a level signal having a timing component indicative of said level capacitance and the timing component indicative of said reference level capacitance.

4. An assembly as set forth in claim 1 further characterized by said reference timing means [(40)] *(48)* comprising *an* astable multivibrator for producing said reference signal having frequency representative of said reference capacitance.

5. An assembly as set forth in claim 4 further characterized by said level timing means (50) comprising monostable multivibrator for producing said level signal having pulsewidth indicative of said level capacitance and said frequency indicative of said reference capacitance.

6. An assembly as set forth in claim 5 further characterized by said reference timing means (48) including reference resistive means (52) for acting with said reference capacitance for establishing a time constant of said reference signal.

7. An assembly as set forth in claim 6 further characterized by said level timing means (50) including level resistive means (54) for acting with said level capacitance for establishing a time constant of said level signal.

8. A capacitive level gauge assembly for placement in a container to determine the amount of level of a substance therein, said assembly comprising; sensing means (18) having [a] first and second [end] *ends* (22) for measuring the level of substance between said first and second [end] *ends*; said sensor means including measurement capacitance means (24) extending between said first and second ends comprising at least two parallel conductive members to establish an electrical capacitance *therebetween* representative of level, and reference capacitance means (30) connected at said second end (22) comprising at least two parallel conductive members to establish an electrical capacitance *therebetween* representative of dielectric constant; said assembly characterized by control means (34) responsive to said level capacitance and said reference capacitance for producing a *pulsing* level signal having a frequency indicative of one of said level capacitance and said reference capacitance and a pulse width indicative of the other of said level capacitance and said reference capacitance.

9. A capacitive sensor assembly for placement in a container to determine the level of substance therein, said assembly comprising; measurement capacitance means (24) comprising at least two parallel conductive members establishing a level capacitance which varies as a function of level, reference capacitance means (30) comprising at least two parallel conductive members establishing a reference capacitance which varies as a function of dielectric constant of the material, and longitudinal support means having a first end (20) and a second end (22), said second end (22) for supporting said reference capacitance means (30) longitudinally extending along said support means immersed in the substance (14) and said measurement capacitance means (24) longitudinally spaced apart from said reference capacitance means (30) and longitudinally extending along said support means from said second end (22).

10. An assembly as set forth in claim 9 further characterized by said support means including a base insulator located at said second end and an intermediate insulator located between said first and second ends and a ceiling insulator located at said first end, said measurement capacitance means (24) comprising a plurality of parallel wires connected between said intermediate insulator and said ceiling insulator and said reference capacitance means (30) comprising a plurality of parallel wires connected between said intermediate insulator and said base insulator.

11. An assembly as set forth in claim 9 further characterized by said support means being cruciform shaped and said measurement capacitance means (24) comprising two parallel wires wound about said support means in helical configuration from said first end to said second end and said reference capacitance means (30 comprising two parallel wires wound about said support means in helical configuration at said second end.

12. An assembly as set forth in claim 9 further characterized by said measurement capacitance means (24) comprising two parallel plates extending from said first end toward said second end and said reference capacitance means (30) comprising two parallel plates at said second end, said support means supporting said plates along edges of said plates.

*13. A capacitive sensor assembly for placement in a container to determine the level of substance therein, said assembly comprising; sensing means (18) separate from the container for measuring the level of substance; said sensing means including measurement capacitance means (24) comprising at least two parallel conductive members to establish an electrical capacitance representative of level therebetween, and reference capacitance means (30) comprising at least two parallel conductive members to establish an electrical capacitance representative of dielectric constant; measuring means (34) responsive to said reference capacitance means (30) for producing a reference signal representing dielectric constant and responsive to said level capacitance for producing a pulsing level signal representing level of a substance, said measuring means (34) including reference oscillator timing means (48) connected to said reference capacitance means (30) for producing a pulsing reference signal having a first component indicative of said reference capacitance, and a level oscillator timing means (50) independent and separate from said reference timing means (30) and connected to said measurement capacitance means (24) for producing said level signal having a timing component indicative of said level capacitance.*

*14. A capacitive level gauge assembly for placement in a container to determine the amount or level of a substance therein, said assembly comprising; sensing means (18) separate from the container for measuring the level of substance; said sensing means including measurement capacitance means (24) comprising at least two parallel conductive members to establish an electrical capacitance therebetween representative of level, and reference capacitance means (30) comprising at least two parallel conductive members to establish an electrical capacitance therebetween representative of dielectric constant; measuring means (34) responsive to said level capacitance and reference capacitance for producing a pulsing level signal representing both level and dielectric constant; said measuring means (34) including reference oscillator timing means (48) connected to said reference capacitance means (30) for producing a pulsing reference signal having a timing component indicative of said reference capacitance and independent of said level capacitance and level oscillator timing means (50) connected to said measurement capacitance means (24) for receiving said reference signal and producing a pulsing level signal having a timing component indicative of said level capacitance and the timing component indicative of said reference level capacitance.*

*15. A capacitive level gauge assembly for placement in a container to determine the amount or level of a substance therein, said assembly comprising; sensing means (18) for measuring the level of substance; said sensor means including measurement capacitance means (24) comprising at least two parallel conductive members to establish an electrical capacitance therebetween representative of level, and reference capacitance means (30) comprising at least two parallel conductive members to establish in electrical capacitance therebetween representative of dielectric constant; said assembly characterized by control means (34) responsive to said level capacitance and said reference capacitance for producing a pulsing level signal having a frequency indicative of one of said level capacitance and said reference capacitance and a pulse width indicative of the other of said level capacitance and said reference capacitance.*

* * * * *